United States Patent [19]

Hoch

[11] 4,164,983
[45] Aug. 21, 1979

[54] WALK-BEHIND FILLER WITH COMBINED DRAG STAKE AND WHEEL

[75] Inventor: John J. Hoch, Beaver Dam, Wis.

[73] Assignee: Deere & Company, Moline, Ill.

[21] Appl. No.: 879,202

[22] Filed: Feb. 21, 1978

[51] Int. Cl.² .................... B62D 51/04; A01B 33/02
[52] U.S. Cl. .................................... 172/43; 180/19 R
[58] Field of Search ................ 172/42, 43, 125, 244, 172/259, 395, 397; 180/19 R, 19 S, 19 H

[56] References Cited

U.S. PATENT DOCUMENTS

| | | | |
|---|---|---|---|
| 1,248,673 | 12/1917 | Kochendorfer | 172/244 |
| 2,151,117 | 3/1939 | Kepler | 172/259 X |
| 2,903,077 | 9/1959 | Kamlukin | 172/42 |
| 3,074,490 | 1/1963 | Burns | 172/125 X |
| 3,180,428 | 4/1965 | Price | 172/42 |
| 3,792,734 | 2/1974 | Ellis et al. | 172/43 |

FOREIGN PATENT DOCUMENTS

| | | | |
|---|---|---|---|
| 940366 | 1/1974 | Canada | 172/259 |
| 1062044 | 7/1959 | Fed. Rep. of Germany | 172/42 |
| 1441015 | 6/1976 | United Kingdom | 172/43 |

*Primary Examiner*—Richard T. Stouffer

[57] ABSTRACT

The support wheels and drag stake of a walk-behind rotary tiller are connected to the main frame of the tiller at a location rearwardly of the tiller tines through means of a mounting bracket, which is mounted for pivotal movement between and to be releasably secured in a first position, wherein the wheels are disposed in a downward position relative to the tiller frame for transport while the drag stake is in an inactive elevated position, and a second position, wherein the drag stake is disposed for retarding the forward progress of the tiller while the wheels are in an elevated position for contacting the ground only after the tines have reached the desired tilling depth.

10 Claims, 2 Drawing Figures

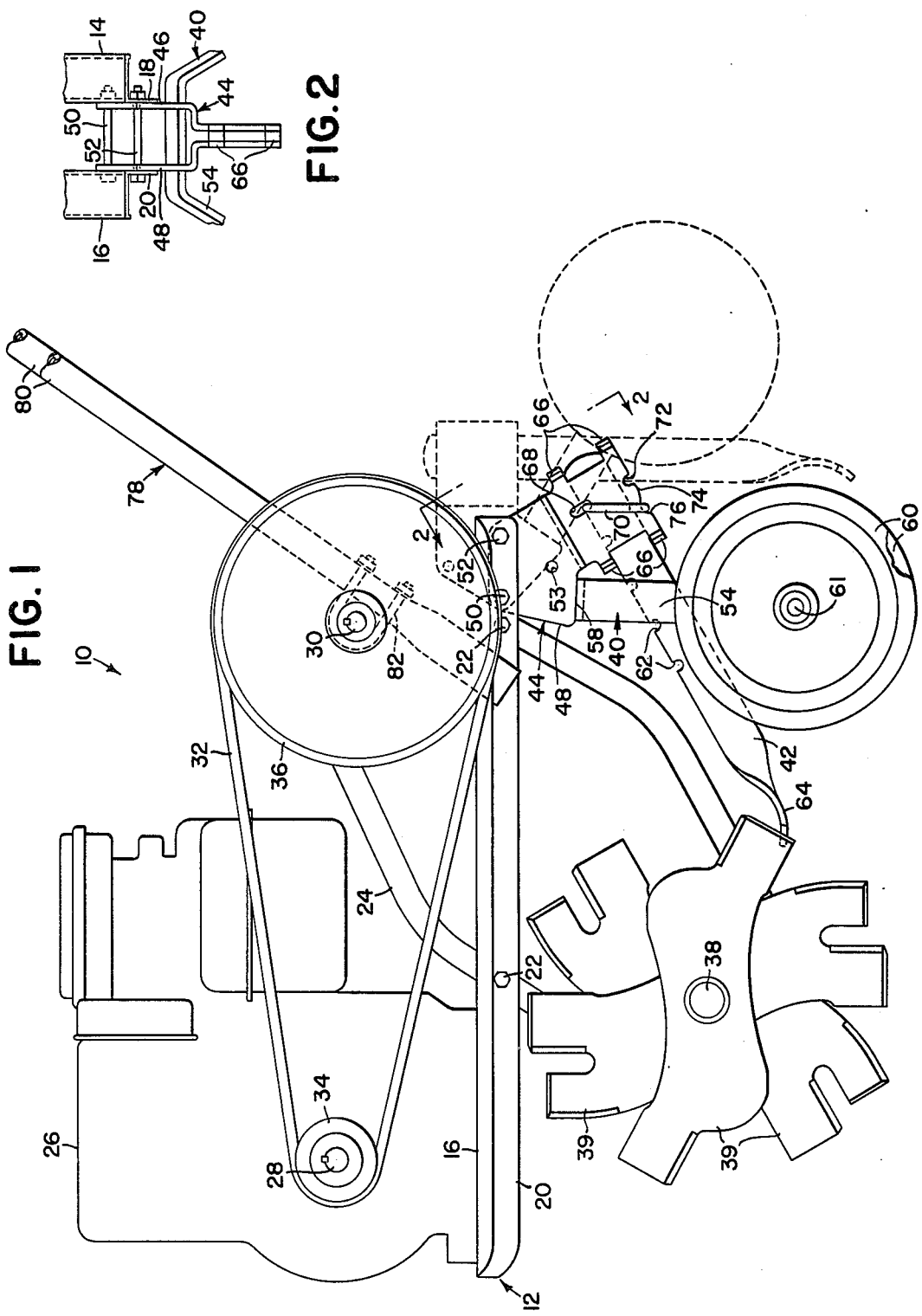

WALK-BEHIND TILLER WITH COMBINED DRAG STAKE AND WHEEL

BACKGROUND OF THE INVENTION

The present invention relates to walk-behind rotary tillers and more specifically relates to the manner of mounting support wheels and drag stakes to the frames of such tillers.

U.S. Pat. No. 3,792,734 issued to Ellis et al on Feb. 19, 1974 discloses a tiller which is representative of the type here under consideration. Specifically, this patent discloses a tiller structure including an engine-driven set of rotary tines or blades located forwardly of a pair of ground wheels located between the tines and a drag stake. The ground wheels are vertically adjustably linked to the tiller frame for movement among various positions including an extreme lower position for establishing a transport condition and an extreme raised position for establishing a maximum depth working position. While not specifically disclosed as such, the drag bar is assumed to be constructed and mounted in a manner permitting vertical adjustment thereof, to vary the resistance to forward movement of the tiller to thereby ensure that the tines will drag to the desired depth before progressing forwardly, and in a manner permitting pivoting thereof to a transport position. U.S. Pat. No. 2,903,077 granted to Kamlukin on Sept. 8, 1959 discloses such a drag stake mounting.

One problem attendant with rotary tillers constructed similarly to the aforementioned patented structures is that with the wheels located between the tines and drag stake, the wheels sometimes act to prevent the drag stake from entering the ground to the depth required for resisting forward movement of the tiller sufficiently to ensure that the tines will operate at the desired depth. U.S. Pat. No. 3,074,490 granted to Burns on Jan. 22, 1963 discloses a tiller not having this disadvantage since, there, the drag stake is located between the tines and the ground wheels. However, due to its location the drag stake disclosed in Burns cannot easily be elevated to a transport as is often desirable when turning the tiller at the end of a plot of ground being tilled.

Another problem attendant with rotary tillers having structures similar to those of the aforementioned patented structures is that the ground wheels and drag stakes thereof are mounted such as to require them to be separately adjusted between their respective transport and working positions and such as to require the removal and reinsertion of locking pins and the like.

SUMMARY OF THE INVENTION

According to the present invention there is provided a novel manner of mounting a drag stake and pair of ground wheels to a tiller frame.

An object of the invention is to provide a walk-behind tiller with a pair of ground wheels and a drag stake mounted such that the drag stake enters the ground rearwardly of the tines a distance no greater than are the wheels and such that the drag stake is easily movable between a lowered, working position and a raised, transport position.

Another object is to provide a tiller having a pair of wheels and a drag stake mounted such that the wheels are easily movable between lowered transport position and raised working position and the drag stake is easily movable between a raised transport position and a lowered working position.

Yet another object is to provide a tiller having a single bracket for pivotally connecting both the pair of wheels and the drag stake to the tiller frame, the bracket being movable between a first position, wherein the wheels and drag stake are in their respective transport positions and a second position, wherein the wheels and drag stake are in their respective working position.

A more specific object is to provide a tiller having a wheel and drag stake mounting bracket pivoted, as described in the immediately preceeding object, and having the wheel axis related to the bracket pivot axis such that the wheel axis will move from one side to the other of the vertical plane containing the bracket pivot axis when the bracket is pivoted between its raised and lowered positions.

These and other objects will become apparent from a reading of the following description together with the appended drawings.

BRIEF DESCRIPTION OF THE DRAWING

FIG. 1 is a left side elevational view of a tiller constructed according to the principles of the present invention and showing the respective transport positions of the wheels and drag stake in solid lines and showing the respective working positions of the wheels and drag stake in dashed lines.

FIG. 2 is a vertical section, taken along line 2—2 of FIG. 1, showing the connection of the wheel and drag stake mounting bracket with the tiller frame, the drag stake being omitted and the wheels broken away for clarity and simplicity.

DESCRIPTION OF THE PREFERRED EMBODIMENT

Referring now to FIG. 1 of the drawing, therein is shown a rotary tiller indicated in its entirety by the reference numeral 10. The tiller 10 includes a fore-and-aft extending main frame 12 defined by parallel, spaced apart right and left channel members 14 and 16, respectively, having inner vertical flanges 18 and 20 disposed on opposite sides of and bolted, as at 22, to a chain case 24 which inclines downwardly and forwardly from a location above the rear end of, to a location beneath, the frame 12. It is here noted that the bolts 22 also serve in conjunction with a series of other bolts (not shown) to hold opposite halves of the chain case 24 together.

Mounted on the frame 12 adjacent its forward end is an internal combustion engine 26 having an output shaft 28 projecting from its left side. Arranged parallel to the shaft 28 is a shaft 30 which is journalled in the upper end of the chain case 24, and, provided for transferring the rotation of the shaft 28 to the shaft 30 is a drive belt 32, which is disposed about a small pulley 34 fixed to the shaft 28 and a larger pulley 36 fixed to the shaft 30 in fore-and-aft alignment with the pulley 34. A belt-tensioning mechanism (not shown) is preferably provided for selectively establishing a slack non-power transmitting condition in the belt 32. Journalled in the lower end of the chain case is a shaft 38 to which a plurality of tines or blades 39 are fixed. Rotation of the shaft 30 is transferred to the shaft 38 by means of a chain and sprocket reduction drive (not shown) of conventional construction.

As appears in solid lines in FIG. 1, a support wheel assembly 40 and a drag stake 42 are disposed in their respective transport positions and fixed to a rear end portion of the frame 12 by means of a mounting bracket 44. Specifically, the bracket 44 comprises right and left opposed plates 46 and 48 having first portions spaced apart and respectively embracing inner surface portions of the frame flanges 18 and 20 and secured thereto by means of a bolt 50, which extends through axially aligned first sets of holes provided in each of the plates and flanges and a locking pin 52 which extends through second sets of aligned holes provided in each of the plates and flanges. The bolt 50 is located forwardly of the pin 52 and defines an axis about which the bracket 44 may be swung, when the pin 52 is removed, from a lowered position disposing the wheel assembly 40 and drag stake 42 in respective transport positions, as shown in solid lines in FIG. 1 to a raised position disposing the wheel assembly 40 and drag stake 42 in their respective working positions, as illustrated in dashed lines in FIG. 1. The bracket plates 46 and 48 are provided with a further set of holes 53 which align with the second set of holes in the frame flanges such that the locking pin 52 may be reinserted to hold the bracket 44 in its raised position.

The wheel assembly 40 includes a wheel-mounting bar or strap 54 including a pair of legs joined by a central portion, the central portion being fixed, as by weldments, to edge portions of the bracket plates 46 and 48 (only edge portion 58 of plate 48 being shown) and a pair of wheels 60 being rotatably mounted adjacent respective free end portions of the legs for rotation about an axis 61 which is so located relative to the axis defined by the bolt 50 that it moves "over center" relative to a vertical plane containing the axis defined by the bolt 50 when the bracket 44 is swung between its raised and lowered positions. This "over center" movement of the axis 61 is important as it permits the bracket 44 to be used without the locking pin 52 since the weight of the machine supported by the wheel will act on the latter to maintain the bracket 44 in whichever of its raised and lowered positions it is placed.

The drag stake 42 comprises an elongate flat bar having a series of notches 62 provided along a leading edge portion thereof and having a lower end 64 adapted to penetrate the ground. The drag stake 42 projects centrally between the legs of the wheel-mounting bar 54 and between closely spaced portion of the bracket plates 46 and 48, the portions having cooperating parts fixed together to define four tabs 66, two of which are located forwardly of, and two of which are located rearwardly of the drag stake 42 in close juxtaposition to the latter to thus form means for confining the stake between the plates 46 and 48. An elongate opening 68 is provided in the plates 46 and 48 such that one end thereof registers with a selected one of the stake notches 62 and a lock member 70 in the form of a rectangular ring segment extends through the opening 68 and is received in the selected notch 62 to hold the stake in a selected vertical position for entering the ground to a desired depth when the stake 42 is in its dashed line working position shown in FIG. 1. Aligned with the elongated opening 68 and slightly deeper than the notches 62 in the stake 42 is a notch 72, defined by respective edge portions of the bracket plates 46 and 48, which serves to permit the lock member 70 to be shifted out of the selected notch 62 upon the member 70 being forcibly expanded and swung upwardly over a retaining surface 74 provided between the notch 72 and a recess 76 in which the lock member 70 rests during operation.

The tiller 10 includes a rearwardly projecting handle 78 including a pair of legs 80 disposed in straddling relationship to the chain case 24 and respectively fixed, as by U-bolts 82 (only the left one is shown), to cylindrical members, not shown, fixed to and projecting from the opposite sides of the chain case 24 and having the shaft 30 received therein.

The operation of the tiller 10 is as follows. With the wheel and drag stake mounting bracket 44 being disposed in its lowered position shown in solid lines in FIG. 1 and with power transmission between the pulleys 34 and 36 being interrupted, the tiller 10 is ready to be transported since the drag stake 42 and wheels 60 are then respectively in their raised and lowered transport positions. Transporting of the tiller is accomplished by pivoting the tiller back on wheels 60, by pressing downwardly on the handle and then by pushing or pulling the tiller to a desired tilling site.

The tiller is then readied for tillage operation by tilting the tiller 10 upwardly on the tines 39 and removing the lock pin 52. The tiller is then tilted backwardly on the wheels 40 which causes the bracket 44 to move to its raised position, as illustrated in FIG. 1, wherein the set of holes 53 are aligned with those in the frame 12. The pin 52 is then reinserted. The drive belt 32 is then tensioned by means not shown to establish a driving relationship between the engine 26 and tines 39. If the drag stake has not penetrated the ground to the extent that the wheels 60 rest upon the ground, the operator may effect such operation by pushing downwardly on the handle 78.

To again ready the tiller for transport, the operator needs only to tilt the tiller upwardly on the tines and again remove the lock pin 52. The bracket 44 is then free to pivot about the pin 50 and the operator can easily place it in its lowered position by pressing downwardly on the upper end of the drag stake 42 with his foot. Once in its lowered position, the bracket 44 is held in place by reinserting the pin 52.

It is important to note that for many conditions the locking pin 52 is not necessary since the weight of the tiller will act to maintain the bracket 44 in one or the other of its positions as desired. This is brought about by the fact that when the bracket 44 pivots between its raised and lowered positions the axis 61 of the wheels 60 moves "over center" relative to the vertical plane containing the axis defined by the bolt 50.

I claim:

1. In a walk-behind rotary tiller including a frame having a set of rotary tines, a pair of transversly spaced wheels and a drag stake secured thereto and disposed therebeneath, with the wheels and drag stake being located rearwardly of the tines and with the drag stake being mounted for pivoting between a raised transport position and a lowered working position, wherein said drag stake has a lower end which moves rearwardly from said transport to said working position, the improvement comprising: said drag stake both extending between said transversely spaced wheels and being entirely located no further rearward than the bottom most surface of the wheels when the drag stake is in its working position; and said drag stake further having an upper end disposed rearwardly farther than that location where the wheels are secured to the frame.

2. The walk-behind tiller defined in claim 1 wherein a single bracket has said pair of wheels and drag stake fixed thereto; and connection means pivotally mounting said bracket on the frame for movement about an axis defined by the connection means between a lowered position, wherein the wheels and drag stake are in respective transport positions, and a raised position, wherein the wheels and drag stake are in respective working positions.

3. The walk-behind tiller defined in claim 2 wherein the drag stake is secured to the bracket such that the latter supports the drag stake in a substantially vertical orientation when the bracket is in its raised position.

4. The walk-behind tiller defined in claim 2 wherein the wheels are rotatable about a second axis extending parallel to the axis defined by the connection means; and said wheels being located relative to the last-mentioned axis such that said second axis moves from one side to the other of a vertical plane containing said axis defined by the connection means when the bracket is moved between its raised and lowered positions.

5. The walk-behind tiller defined in claim 2 and further including a second connection means for releasably retaining said bracket in one or the other of said raised and lowered positions.

6. In a walk-behind tiller including a main frame to which a set of rotary tiller tines, a pair of transversely spaced wheels and a drag stake are attached, the improvement comprising: a bracket; a connection means mounting said bracket on the frame for vertical swinging movement between raised and lowered positions; said wheels and drag stake being attached to the frame soley through means of the bracket; said wheels being disposed so as to respectively occupy lowered transport and raised working positions when the bracket is in its lowered and raised positions; and said drag stake being disposed so as to respectively occupy raised transport and lowered working positions when the bracket is in its lowered and raised positions.

7. The walk-behind tiller defined in claim 6 wherein the first connection defines a first axis about which the bracket is pivotable between said lowered and raised positions; and said wheels being rotatable about a second axis and being so located relative to the first axis that said second axis moves "over center" relative to a vertical plane containing said first axis when the bracket is moved between its lowered and raised positions.

8. The walk-behind tiller defined in claim 7 wherein the first connection means includes a transversly extending bolt received in a set of aligned holes in the bracket and frame; and a the second connection means including a locking member releasably received in a second set of aligned holes in the bracket and frame.

9. The walk-behind tiller defined in claim 6 wherein said drag stake is oriented relative to the bracket and wheels so as to extend generally vertically when in its working position, at a location no further rearwardly than lowermost locations of the wheels.

10. The walk-behind tiller defined in claim 6 wherein the pair of wheels are respectively attached to opposite legs of a U-shaped strap having a central portion connecting the legs and fixed to the bracket; and said drag stake extending between and generally crosswise to said legs.

* * * * *

UNITED STATES PATENT OFFICE
CERTIFICATE OF CORRECTION

Patent No. 4,164,983          Dated    21 August 1979

Inventor(s)    John J. Hoch

It is certified that error appears in the above-identified patent and that said Letters Patent are hereby corrected as shown below:

Cover sheet, (54) Title: delete "WALK-BEHIND FILLER WITH COMBINED DRAG STAKE AND WHEEL" and insert -- WALK-BEHIND TILLER WITH COMBINED DRAG STAKE AND WHEEL --.

Column 1, lines 1 and 2, delete "WALK-BEHIND FILLER WITH COMBINED DRAG STAKE AND WHEEL" and insert -- WALK-BEHIND TILLER WITH COMBINED DRAG STAKE AND WHEEL --.

Signed and Sealed this

Eighth Day of July 1980

[SEAL]

Attest:

SIDNEY A. DIAMOND

Attesting Officer    Commissioner of Patents and Trademarks